US006840733B2

United States Patent
Björn et al.

(10) Patent No.: US 6,840,733 B2
(45) Date of Patent: Jan. 11, 2005

(54) APPARATUS FOR TRANSPORTING AND STACKING GOODS, IN PARTICULAR IN THE FORM OF PLATES, AND CORRESPONDING PROCESS

(75) Inventors: Michel Björn, Stuttgart (DE); Gericke Stephan, Osfildem (DE)

(73) Assignee: LTG Mailänder GmbH, Stuttgart (DE)

( * ) Notice: Subject to any disclaimer, the term of this patent is extended or adjusted under 35 U.S.C. 154(b) by 196 days.

(21) Appl. No.: 10/172,205

(22) Filed: Jun. 14, 2002

(65) Prior Publication Data

US 2003/0039536 A1 Feb. 27, 2003

(30) Foreign Application Priority Data

Jun. 15, 2001 (DE) .......................... 101 29 988
Nov. 16, 2001 (DE) .......................... 101 57 098

(51) Int. Cl.[7] ............................................. B65G 57/09
(52) U.S. Cl. ..................... 414/794.4; 271/196; 414/801
(58) Field of Search ........................... 414/794.4, 793.2, 414/793.3, 923, 801; 198/689.1, 690.1; 271/193, 196, 197

(56) References Cited

U.S. PATENT DOCUMENTS 3,144,927 A * 8/1964 Buccicone .................. 198/679

FOREIGN PATENT DOCUMENTS

| DE | 1 090 579 | 10/1960 |
| DE | 1 118 099 | 11/1961 |
| DE | 44 00 084 A1 | 7/1995 |
| DE | 196 36 086 A1 | 3/1998 |
| DE | 199 35 665 A1 | 3/2001 |
| DE | 199 63 461 A1 | 7/2001 |
| JP | 05077995 | 3/1993 |

* cited by examiner

*Primary Examiner*—Donald W. Underwood
(74) *Attorney, Agent, or Firm*—Bateman IP Law Group

(57) ABSTRACT

The apparatus (10) serves for transporting and stacking goods (12), in particular in the form of plates such as metal plates or the like, and includes a feed transport device (14), which is connected to a stacking device (16). In this apparatus an overhead transport device (18) is provided which is disposed at least partially in a stacking area (20) above the stacking device (16) and which has a holding system (22) which can be activated and deactivated, where a delay system is provided for time-delayed activation of an effective holding force of the overhead transport device at a point in time when the front, seen in the direction of transport, area of the goods overlaps the stacking area in the direction of stacking.

39 Claims, 3 Drawing Sheets

APPARATUS FOR TRANSPORTING AND STACKING GOODS, IN PARTICULAR IN THE FORM OF PLATES, AND CORRESPONDING PROCESS

BACKGROUND

The invention relates to an apparatus for transporting and stacking of goods, in particular in the form of plates such as metal plates or the like, with a feed transport device which is connected to a stacking device according to the preamble of claim 1.

Furthermore, the invention relates to a process for transporting and stacking goods, in particular in the form of plates such as metal plates or the like, where the current goods are fed by means of a feed transport device with an, in particular, adjustable feed rate, according to the preamble of claim [sic] 15.

Apparatuses and processes of the type stated initially are already known. In the case of traditional systems of this type, metal plates, in particular imprinted and/or lacquered, running in tandem are introduced into a stacking device, by way of example formed as a stack box, and there are stacked lying on one another. Therein the metal plate feed is accomplished by means of a feed transport device connected at the front in relation to the stacking device, by way of example in the form of a feed belt transport device, which is preferably operated at a constant rate. The metal plates are conveyed horizontally into the stacking device (stack box), braked after the last path section by means of a fixed stop absorption system, and finally stored in the stacking device. Therein the metal plates describe, on running into the stacking device, a flight path wherein the front metal plate corners incline more or less toward dipping. Dipping of this type, in particular in the case of metal plates with so-called "scroll plate sections," is so pronounced that the relatively unstable corners swing through very sharply downwards. Such undesired swinging motions of a current metal plate can lead to the front plate corner of a metal plate reaching the stacking device dipping into the section gap of a metal plate already lying (stored) in the stacking device and interlocking with its edges. This leads to a disturbance of the stack in the device, said disturbance to be avoided as a matter of principle and frequently causing a complete running into one another of the metal plates and thus possibly leading to the entire production line coming to a standstill.

It is the objective of the invention to provide an apparatus and a process of the type stated initially by means of which a disturbance-free and correct transporting and stacking of goods, in particular in the form of plates, is possible, preferably with a relatively high throughput of goods (number of transported and stacked goods per unit of time).

The objective is realized by an apparatus with the features of claim 1. The apparatus is characterized by an overhead transport device which is disposed at least partially in a stacking area above the stacking device and which has a holding system which can be activated and deactivated, where a delay system is provided for time-delayed activation of an effective holding force of the overhead transport device at a point in time when a front, seen in the direction of transport, area of the goods overlaps the stacking area in the direction of stacking. In addition the overhead transport device serves in particular for braking the current goods essentially up to a standstill in a stacking mode position (transport velocity zero or nearly zero) and for the subsequent stacking of the goods in the stacking device, in particular by free fall (stacking direction) of the same. Since the goods (for example, metal plates) then fall downwards essentially perpendicularly in the stacking device, practically no horizontal relative motion of each metal plate to be stacked takes place during the actual stacking process so that no undesired interlocking of metal plates having so-called "scroll corners" can occur in the stacking device. The braking of a current metal plate can then be done controlled by means of the holding system of the overhead transport device and not, as in the state of the art, by means of a fixed stop absorption system in which the horizontal kinetic energy of a metal plate is exhausted by a substantially frontal, elastic impact.

Damage of metal plates to be disposed lying on one another can then be avoided in a reliable manner since the metal plate currently to be stacked in the stacking device is not moved along a flight path with horizontal component but rather storing of the same is accomplished in the form of a free fall essentially purely in the vertically direction. In this manner relative motions between two metal plates lying on one another and thus corresponding surface damage as a consequence of friction are avoided. Moreover, the metal plate currently to be stacked is not exposed to a sudden force of impact in the horizontal direction (stop) which in particular can cause damage to the edges of the metal plate. Advantageously, alignment movements of a current metal plate in the stacking device, such as, for example, in the form of a pushing back of a currently upper metal plate in the stacking device, can be omitted since the metal plates are always positioned in a definite stacking mode position by means of the holding system of the overhead transport device before its free, vertical fall in the stacking device. Thus, horizontal relative movements between metal plates already lying on one another in the stacking device (alignment movements) can also be avoided. The apparatus according to the invention thus makes it possible to separate horizontal movement phases from vertical movement phases in such a way that no horizontal relative movement between two metal plates in contact can arise and thus also no danger of interlocking and/or danger of scratching on the surfaces of the same. In given cases, the feed transport device can be formed as an overhead transport device so that merely a single transport device is provided. Furthermore, a large throughput of goods through the apparatus and thus a rapid stacking of the same goods is made possible since the delay time period is utilized for the transport of goods as well as for bridging the necessary activation time of an effective holding force in the overhead transport device.

Advantageously the holding system is adjustable in its velocity. Thereby it is possible that the kinetic energy of a current metal plate can then be completely exhausted merely by motor by means of a, by way of example electromotive, braking system, where the corresponding metal plate can still be located in an extended run-in plane of the stacking device. Here "adjustable in its velocity" is understood to mean that the holding system, by way of example, can be set variably by means of a control unit to different operating velocities. The operating velocities can each be changeable as a constant, continuously, or discontinuously. The delay time period can thus be utilized for the transport of goods as well as for the simultaneous acceleration of the holding system (for example, in the form of an overhead transport device) to a predetermined operating velocity so that also thereby a greater throughput through the apparatus and thus a more rapid stacking of the same goods is made possible.

Advantageously the holding system has at least one overhead belt, which is coupled to a vacuum and/or magnetic system to form a, in particular, variable holding force. In this case the overhead belts are provided with holes by use of a vacuum system. By means of a holding system of this type holding forces can be generated which act upwards through the overhead belt and thus make possible reliable adhesion of the goods (metal plates) to the overhead belt. In so doing it is possible that the current goods reproduce the exact movement of the overhead belt free of relative movements until on deactivation of the vacuum and/or magnetic system a free fall in the vertical direction of the goods located in the stacking mode position in the stacking device occurs. To guarantee an optimal holding of the plate by means of the holding system, preferably four overhead belts spaced at a distance from one another are provided. The number and/or arrangement of the overhead belts depends, in particular, on the size and geometric form of the goods.

According to a possible form of embodiment the feed transport device is formed below the goods to be transported, and in particular as a belt transport device. A feed transport device of this type preferably extends in the horizontal direction and is particularly suited to reliable and rapid feeding of goods, such as, for example, metal plates in the stacking device. In addition the feed transport device can also have a plurality of transport belts, where the arrangement of the transport belts is intended to be adapted to the feed transport device so that an overlapping arrangement of the overhead transport device and the feed transport device is possible.

The overhead transport device preferably has a holding force area whose front, seen in the direction of transport, end lies in the stacking area. Thus the zone of the holding forces of the holding system (vacuum and/or magnetic system) only begins in the area above the stacking device (stack box), preferably several centimeters removed from the stacking device. In the case of overlapping overhead belts and feed belts lying below in front of, seen in the direction of transport, the stacking device, no upwardly directed holding forces are therefore acting on the overhead belt or belts. In this way the (current) overhead belt can be still be influenced with regard to its transport velocity (acceleration phase) while the goods (metal plate) carried by the (current) feed belt and moving in the direction of the overhead belt have still not reached with their front edge the zone of the holding forces of the holding system of the overhead transport device. Thus a fixing of the current goods to the overhead transport device is done at a relatively late point in time.

The holding force area of the overhead transport device and the feed transport device can be disposed at a distance from one another, seen in the direction of transport. In this case the feed transport preferably ends in front of the stacking device. At the same time the feed transport device and the overhead transport device can be disposed overlapping one another, seen in the direction of transport, with the formation of an, in particular, essentially horizontal transport gap. By means of an apparatus of this type it is possible to guarantee reliable transport of goods with correct transfer of the same from the feed transport device to the overhead transport device, where the holding force area of the holding system of the overhead transport device begins relatively toward the back, seen in the direction of transport, that is, in the stacking area of the goods above the stacking device.

According to a possible form of embodiment, the overhead transport device has, in relation to the direction of transport of the feed transport device, an inclined transport surface. In this case the transport surface of the overhead transport device is preferably inclined in relation to the horizontal (horizontal direction of transport of the feed transport device) where the angle of inclination is, in particular, circa 2° to 5°. Thereby it is made possible that the current goods (for example, a metal plate) on beginning running in into the stacking device project freely over the feed transport device and contact the overhead transport device with slight force due to a possible front edge movement without, however, striking the same or a noteworthy deflection of the direction of transport taking place. The transport gap tapering due to the slight inclination of the overhead transport device in the direction of transport causes a gradual approach of the front, seen in the direction of transport, area of the goods to the overhead belt or belts. Thereby a reliable fixing of the current goods on the overhead transport device is guaranteed. This is to be traced back to the fact that the holding forces in the vicinity of the overhead transport device (overhead belt) are disproportionately reduced by the distance of the current goods from the overhead belt. Through the approach of the goods to the overhead belt due to the inclination of the overhead transport device it is prevented that the goods arrive in an area of low holding forces (too great a distance from the overhead belt) and threaten to fall off of the overhead transport device. At the same time the inclination can be kept so small that no negative impact effects due to a negligible change in the direction of transport of the goods can set in.

Preferably the feed transport device and the overhead transport device with regard to their transport surfaces are spaced relative to one another essentially perpendicular to the direction of transport, in particular with a spacing of circa 1 mm to 10 mm. A spacing of this type guarantees an impact-free transfer of a goods (for example, metal plate) from the feed transport device to the overhead transport device.

Advantageously the magnetic system has at least one electromagnet working according to the principle of flux expulsion which on its activation is suitable for the compensation of a magnetic field of at least one permanent magnet. By means of a magnetic system of this type relatively short turn-on and turn-off times (activation and deactivation of the electromagnet) can be achieved. By so doing, current is applied to the electromagnets merely for a relatively brief moment so that ON-period operation is possible. This promotes a very compact construction of the electromagnets. A further advantage consists of the low thermal load of the electromagnets associated with this and the relatively long lifetime of the same resulting from it. By means of a magnetic system of this type a reliable and precisely timed activation and deactivation of the holding system is thus possible.

Preferably a sensor unit is provided for sensing at least one definite transport position of the current goods. The sensor unit can, by way of example, consist of two sensors lying opposite one another for recognition of the back edge of a current metal plate (goods). In this case the signals of the sensor unit are, in particular, important for the precisely timed activation and deactivation of the holding system of the overhead transport device as well as for the corresponding acceleration and braking of the overhead belts of the same.

According to a preferred form of embodiment a central control or regulatory device is provided for setting of the operational parameters of the holding system of the overhead transport device, in particular of the braking and acceleration parameters as well as for the activation and deactivation of the holding system as a function of the transport parameters of the feed transport device and/or of the dimensions of the goods, in particular exploiting the information from the sensor unit. A control or regulatory device of this type serves for the automatic and correct operation of the apparatus.

Advantageously the overhead transport device and/or the stacking device are adjustable in width and/or length and/or height for the adaptation to, in given cases, different format sizes of the goods. Thus goods of the most varied forms and format sizes can be transported and stacked by means of the apparatus.

Advantageously the stacking device has at least one guide wall for the edge of the goods provided with, in particular, a plurality of air outlet openings. Thereby the free fall in the vertical direction of the goods (for example, metal plate) is accelerated in the stacking direction since no air cushion which is too large can build up under the falling goods (particularly important in the case of rectangular plates). In particular, the front and back guide walls for the edge of the goods in the stacking device (for example, stack box) are provided with suitably large air outlet openings.

For the realization of the objective a process for transporting and stacking of goods, in particular in the form of a plate, is furthermore proposed, said process having the features of claim [sic] 15. The process is characterized by the fact that the current goods are transported by means of an overhead transport device into a stacking area in which it is brought essentially to a standstill and subsequently released from the overhead transport device for the stacking of the goods in the stacking device, in particular by free fall of the same, where a time-delayed activation of an effective holding force of the overhead transport device occurs at the point in time when a front, seen in the direction of transport, area of the goods overlaps the stacking area in the direction of stacking. By means of a process of this type the aforementioned advantages in relation to the apparatus can be achieved.

Preferably the process is characterized by the following processing steps:
- conveying the current goods from the feed transport device to the overhead transport device disposed at least partially in the stacking area above the stacking device,
- acceleration of a holding system of the overhead transport device essentially to the feed velocity of the goods,
- activation of the holding system for fixing the goods in a holding force area of the overhead transport device,
- braking of the holding system with the goods until it comes to a standstill in the stacking area,
- deactivation of the holding system for stacking of the goods during the free fall setting in essentially in the vertical direction in the stacking device.

In so doing the feed velocity of the goods achievable by means of the feed transport device is preferably adjustable and constant. A process of this type permits a particularly gentle stacking of goods, such as, for example, of thin metal plates, and at the same time, in given cases, the setting of relatively high transport velocities since by means of the holding system the current goods are braked to a velocity of zero and thus in contradistinction to traditional processes no stopping of the current goods on absorption element has to be done, which could lead to undesired damage to the goods, such as, for example, a front edge of a plate. Furthermore, it is not necessary to provided a stacking fan to influence the "free flight path" of the current goods as is necessary in the case of conventional stacking processes.

According to a preferred embodiment variant the activation of the holding system occurs after reaching a transport surface of the overhead transport device in the holding area by means of the front area of the goods and, in particular, after producing a surface contact of the front area with the transport surface. In this case the holding force area lies preferably within the stacking area of the goods above the stacking device. This make possible a relatively "late" engagement of the holding forces by means of activation of the holding system, preferably when the feed velocity of the goods and the overhead belt velocity are equal.

Preferably a change in the direction of transport of circa 2° to 5° relative to the direction of transport of the feed transport device, and, in particular with regard to the horizontal, occurs during the conveyance of the goods from the feed transport device to the overhead transport device to promote a surface contact of the goods on a transport surface of the overhead transport device by means of the same. Due to the change in the direction of transport, the goods (for example, metal plate) fall vertically in a correspondingly inclined position in the stacking device onto, in given cases, already stacked goods. Also thereby an undesired formation of a relatively large air cushion between the free-falling goods and the stack lying under them can be avoided or at least limited.

Advantageously a back edge of the goods is sensed in a definite transport position by means of a sensor unit for subsequent successive triggering of the activation, the braking, the deactivation, and the acceleration of the holding system. Thus the braking program including the braking process, the turning off of the electromagnets, the restarting of the overhead belts, and turning on of the electromagnets once again is started by means of a back edge pulse. With a front edge sensor a secure execution of the braking process would only be possible indirectly since a light scanner and not a one-way light barrier would have to be used. Furthermore, with the use of a front edge sensor the control would have to recognize the length format of the goods or the front edge sensor would have to be displaceable, whereby an additional operational setting would be necessary.

Advantageously the activation of the holding system is done as a function of sensing of a definite transport position of the goods after a constant, in particular, determinable time period has elapsed. Thus a constant "deadtime" between a sensory recognition of a current goods and a later successful, actual turning on of the holding system is adhered to. This has as a consequence that the goods at a higher transport velocity have already reserved a larger transport path before the turning on of the holding forces by means of the activation of the holding system occurs so that the actual turning of the holding forces at higher velocities in relation to the transport path reserved occurs later.

According to an alternative embodiment variant the point in time of the activation of the holding system is defined as a function of transport velocity of the feed transport device and/or the material and/or the geometric formation of the goods. Thereby a flexible fixing of the current goods on the overhead transport device by means of the holding system is possible.

By means of the control or regulatory device, in particular utilizing a parameter-dependent code field, automatic transporting and stacking of the goods can be done. By way of example, in the case of goods in the form of a plate, the point in time of activation of the holding system can be made a function of the plate material present (for example aluminum/steel), the wall thickness (thin/thick), the plate length and/or width, and the like by means of a parameter-dependent code field. A code field of this type is, in particular, velocity-dependent so that, with increasing transport velocity, the point in time of activation of the holding system is realized accordingly later.

Further advantageous developments of the invention follow from the description.

BRIEF DESCRIPTION OF THE DRAWINGS

The invention is explained in more detail in the following in an embodiment example with the aid of corresponding drawings. Shown are.

DETAILED DESCRIPTION

Figure 1:
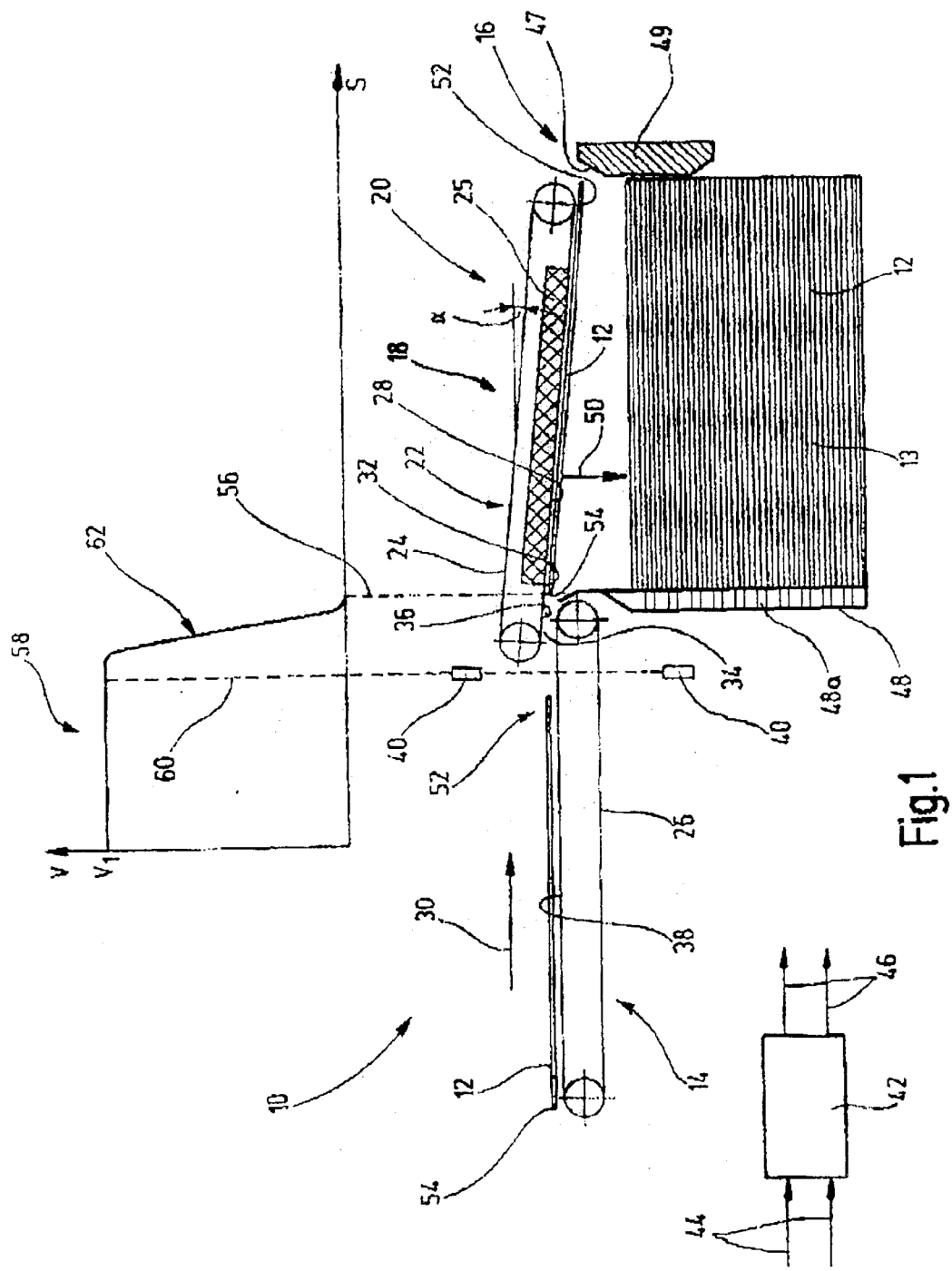
FIG. 1 a schematic, partial sectioned lateral view of an apparatus according to the invention with a graph of velocity as a function of transport path, FIGS. 2 to 5 the apparatus of FIG. 1 in different phases of the transport operation, and FIG. 6 a graph of velocity as a function of transport path for an apparatus according to the invention.

FIG. 1 shows a schematic representation of an apparatus generally designated as 10 for transporting and stacking of goods 12, in particular those in the form of a plate, such as, for example, metal plates or the like. Furthermore, in FIG. 1 a graph 58 of velocity as a function of transport path is represented in FIG. 1 (transport velocity V as a function of transport path S). The apparatus 10 contains a feed transport device 14 which has a transport surface 38 and is connected to a stacking device 16. In addition, an overhead transport device 18 is provided which is disposed above the stacking device 16 and extends completely along a stacking area 20. The overhead transport device 18 has an activatable and deactivatable as well as velocity-selectable holding system 22 by means of which a current metal plate 12 can be fixed on the overhead transport device 18. The overhead transport device 18 serves for braking the current metal plate 12 essentially up to a standstill in a stacking mode position which conforms to the stacking area 20 where during the braking process the metal plate 12 is fixed on the holding system 22, that is, the holding system 22 is activated. For the subsequent stacking of the metal plates 12 in the stacking device 16 the holding system 22 is deactivated so that the metal plate 12 is no longer fixed on the holding system 22 by means of a holding force but rather can fall in free fall essentially in the vertical direction according to arrow 50 onto a stack 13 in the stacking device 16.

The holding system 22 preferably contains a plurality of overhead belts 24 which are coupled to form an adjustable holding force with a vacuum and/or magnetic system 25. Furthermore, the feed transport device 14 is formed as a belt transport device on which the current metal plate 12 can be transported in the direction of transport according to arrow 30 to the overhead transport device 18. In the form of embodiment represented the overhead transport device 18 is provided with a transport surface 36 inclined relative to the direction of transport (arrow 30) of the feed transport device 14. The angle of inclination α of the transport surface 36 to the horizontal is circa 2° to 5°. In addition the feed transport device 14 and the overhead transport device 18 are disposed overlappingly, seen in the direction of transport (arrow 30), to form a tapering transport gap 34. The distance from the overhead transport device 18 to the feed transport device 14 in the transport gap 34 in this case is preferably circa 1 mm to 10 mm.

The overhead transport device 18 has a holding force area 28 whose first, seen in the direction of transport (arrow 30), end 32 lies in the stacking area 20. Furthermore, the holding force area 28 of the overhead transport device 18 is disposed at a distance, as seen in the direction of transport 30, relative to the feed transport device 14. In the case of the present embodiment example the holding force area 28 extends completely within the stacking area 20 where it begins, seen in the direction of transport 30, behind a boundary line 56 of the stacking area 20. Furthermore, a sensor unit 40 is provided for sensing at least one definite transport position of the current goods 12, in particular their back edge 54. The sensor unit 40 is disposed along a line 60, represented as dotted, and consists of two sensors positioned lying opposite one another. The sensor unit 40 serves to determine the back edge 54 of the current metal plate 12 on reaching a definite transport position (dotted line 60) to insure a precisely timed initiation of individual processing steps by means of the control or regulatory device 42 for rapid and correct transporting and stacking of lead sheet 12 by means of the apparatus 10. The dotted line 60 lies, seen in the direction of transport 30, in front of the boundary line 56 (zero line) as well as in front of the start of the overhead transport device 18. Furthermore, a central control or regulatory device 42 is provided to set the operational parameters of the holding system 22 of the overhead transport device 18, in particular the braking and acceleration parameters as well as for the activation and deactivation of the holding system 22 as a function of the transport parameters of the feed transport device 14 and/or the dimensions of the goods, in particular utilizing the information of the sensor unit 40. The control or regulatory device 42 is effectively connected to the apparatus 10 by means of data transmission lines (arrow 44) and control lines (arrow 46).

The staking device 16 has a guiding wall 48 for the edge of the goods, said guiding wall preferably being provided with a plurality of air outlet openings 48a. The air outlet openings 48a serve the purpose of avoiding, or at least reducing, a disturbing formation of an air cushion below falling goods or a stack 12 of metal sheets currently to be stored in the stacking device 16. Thereby the free fall 50 in the vertical direction of the goods (for example, metal late is accelerated in the stacking direction since no air cushion which is too large can build up under the falling goods (particularly important in the case of rectangular plates). In particular, the front and back guide walls for the edge of the goods in the stacking device (for example, stack box) may be provided with suitably large outlet openings 48a. Moreover, the stacking device 16 contains a guiding element 49 for the edge of the goods, said guiding element, like the guiding wall 48 for the edge of the goods, having a guiding bevel 47 but not extending over the maximum possible height of the stack. The guiding wall 48 for the edge of the goods and the guiding element 49 for the edge of the goods together form a stack box.

The overhead transport device 18 and/or the stacking device 16 are adjustable in their width and/or length and/or height for adaptation to the format sizes of goods, which may be different in given cases. The magnetic system 25 is preferably formed in such a manner that it has at least one electromagnet working according to the principle of flux expulsion, said electromagnet being suitable on its activation for the compensation of a magnetic field of at least one permanent magnet.

The graph 58 shows a transport velocity curve for the apparatus 10 in FIG. 1 as a function of the transport path S for a metal plate 12. The metal plate 12 is first transported by means of the feed transport device 14 at the constant rate V1 until the back edge 54 of the metal plate 12 is sensed by the sensor unit 40 and thus has reached the dotted line 60 represented in FIG. 1. After an adjustable delay path the metal plate 12 is braked according to the curve 62 by means of the overhead transport device 18 until it comes to a standstill, until the back edge 54 of the metal plate 12 exactly reaches the boundary line 56 (zero line), and thus the metal plate 12 has assumed its exact stacking mode position. Additional details in relation to the mode of function of the apparatus 10 follow from FIGS. 2 to 5.

Figure 2:
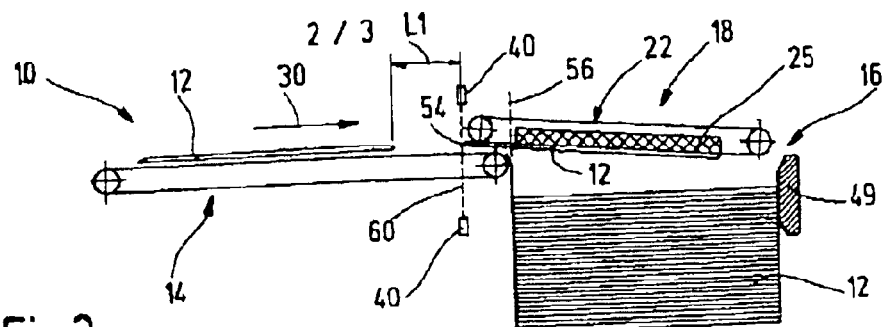
Figure 3:
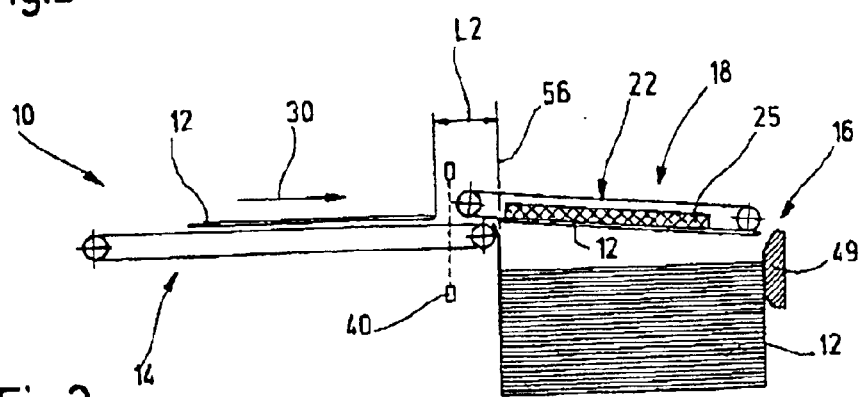
Figure 4:
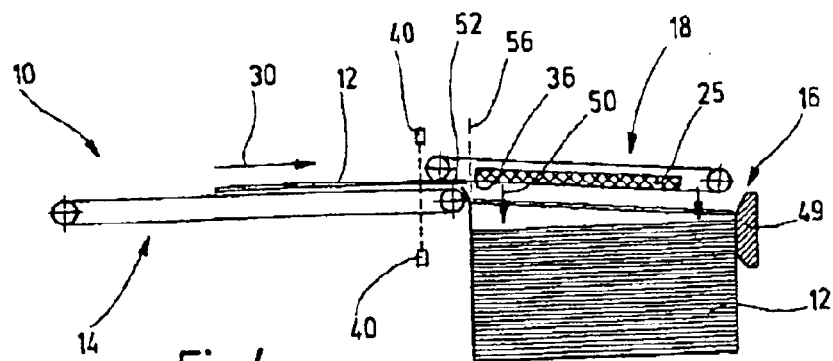
Figure 5:
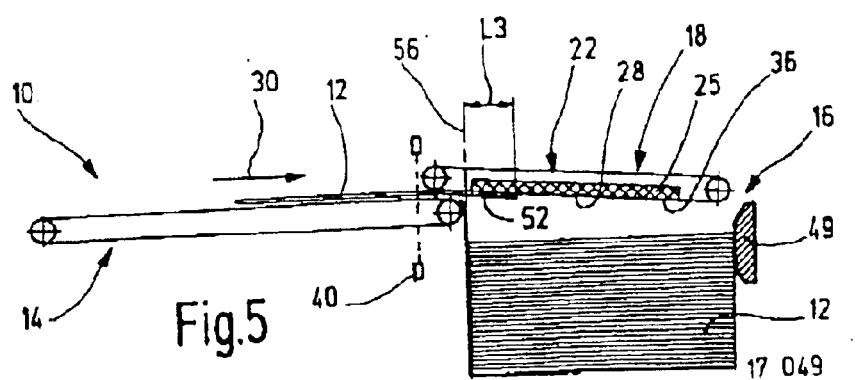

FIGS. 2 to 4 shows different transport phases of metal plates 12 to be transported and stacked by means of the apparatus 10. FIG. 2 shows a metal plate 12 fixed on the overhead transport device 18, the back edge 54 of said metal plate having reached the dotted line 60 and thus having been detected by the sensor unit 40. At the same time an additional metal plate 12 is being transported from the feed transport device 14 in the direction of transport (arrow 30) with the velocity V1 (see also FIG. 1) in the direction of the overhead transport device 18. The two metal plates 12 of FIG. 2 are transported in the apparatus 10 with a spacing of L1 (by way of example 400 mm) and with a constant transport velocity of V1 (by way of example 3.5 meters per second). Braking of the metal plate 12 fixed on the overhead transport device 18 follows, in given cases with a time delay, until the same comes to a standstill at a definite stacking mode position according to FIG. 3 (transport velocity equals zero). At the same time the metal plate 12 located on the feed transport device 14 is conveyed further with constant transport velocity V1. In the operational situation of FIG. 2 as well as FIG. 3 the holding system 22 of the overhead transport device 18 for fixing the corresponding metal plate 12 is activated with the formation of a definite holding force. In order to be able to carry out storage of the fixed metal plate 12 in the stacking device 16, the holding system 22 of the overhead transport device 18 is deactivated so that no holding force acts on the metal plate 12 and the same can fall, corresponding to the arrow 50 of FIG. 4, through free fall in the vertical direction, by way of example, onto metal plates 12 already stacked previously. At the same time the metal plate 12 transported by means of the feed transport device 14 comes with its front area 52 into surface contact with the transport surface 36 of the overhead transport device 18, where, of course, the front edge of the same metal plate 12 still has not reached the boundary line 56 (zero line) of the stacking device 16. During this transition phase the holding system 22 of the overhead transport device 18 is deactivated and the overhead belts 24 of the holding system 22 are accelerated from zero to the transport velocity V1 in order to make possible a correct and, in particular, impact-free transfer of the metal plate 12 running in into the stacking device 16 from the feed transport device 14 to the overhead transport device 18. This type of point in time of transfer is reached in the case of an operational situation according to FIG. 5 in which the metal plate 12 projects with its front area into the stacking area 20 by the length L3 and is in surface contact with the transport surface 36 in a section of the holding force area 28 of the overhead transport device 18. The length L3 corresponds, by way of example, to 143 mm. The operational situation according for FIG. 2 follows the operational situation according for FIG. 5, where the metal plate 12 of FIG. 2 to be stacked corresponds to the metal plate 12 of FIG. 5.

The two metal plates 12 of FIG. 3 are then spaced from one another by a length L3 of, by way of example, 250 mm.

Figure 6:
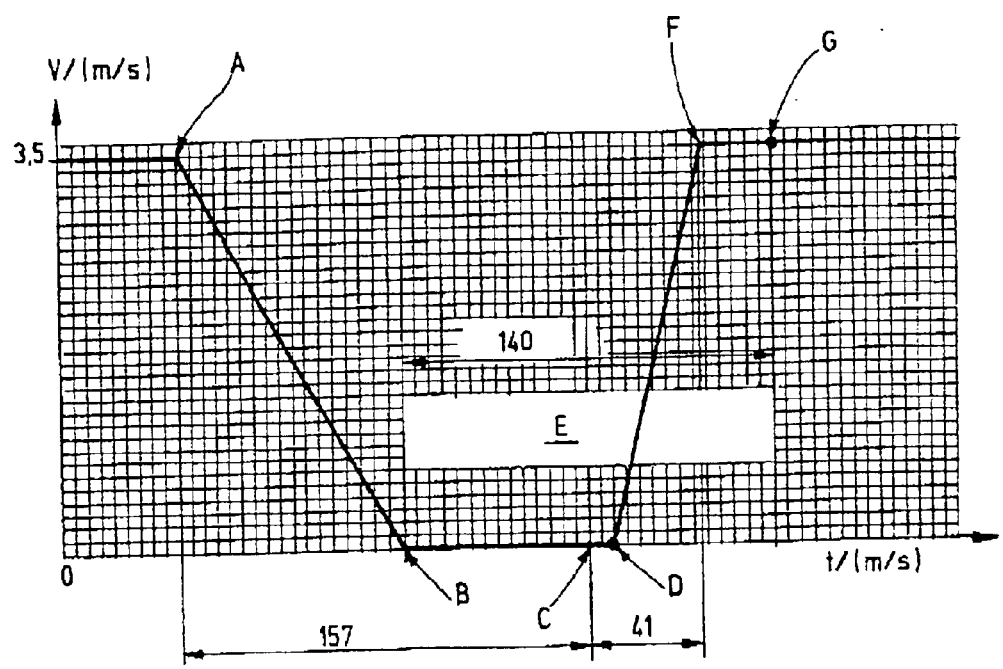

FIG. 6 shows a graph in which the transport velocity V is represented as a function of the transport time t. Point A (corresponds to the point in time of FIG. 2) of the curve marks the beginning of the braking process of the overhead belts 24 of the holding system 22 of the overhead transport device 18, where the braking process is cut off at Point B and the corresponding metal plate 12 comes to a stop in the stacking mode position (V=zero). Point B of FIG. 6 corresponds to the transport mode position of the metal plate 12 of FIG. 3 located above the stacking device 16. From Point B of FIG. 6 the holding system 22 of the overhead transport device 18 is deactivated for a period of time of E (by way of example, 140 ms) so that the metal plate 12 is no longer fixed on the overhead transport device 18 by means of a holding force but rather can fall vertically downwards in free fall in the stacking device 16 at the earliest as of Point B. The Point C marks the point in time of the arrival of the front edge of the following metal plate 12 at the boundary line 56 (zero line) of the stacking device 16. In the present example the period of time between Point A and Point C is 157 ms. Point D marks the beginning of the acceleration process of the overhead belts 24 of the holding system 22 of the overhead transport device 18 from V=zero to V=3.5 m/s (in the present example maximum, constant transport velocity) at Point F. Furthermore, the period of time between Point C and Point F in the present example is 41 ms. On reaching Point F the point in time is reached at which the transport velocity of the current overhead belt 24 and the following metal plate 12 are equal. At that point the front edge of the same metal plate 12 is already located at 143 mm behind, seen in the direction of transport according to arrow 30, the boundary line 56 (zero line) of the stacking device 16 (see also FIG. 5). As of Point F the holding system 22 of the overhead transport device 18 can thus be activated to form the holding force fixing the metal plate 12. At Point G the metal plate 12 reaches the definite stacking mode position so that the holding system 22 can be deactivated (see also FIG. 4). In this example according to FIG. 6 is the total time of one cycle (Point A to Point F) is 198 ms with a rate of production of 2.5 the metal plates per second. In the case of a traditional design for a braking system according to the state of the art the holding forces would already be engaged at Point C after 157 ms. However, according to the invention the engagement of the holding forces occurs at a later point in time, namely at Point F or even later so that a relatively high rate of production can be employed. In the present example according to FIG. 6 the front edge of the current metal plate already projects 143 mm into the stacking area.

The spacing between the end, seen in the direction of transport 30, of the feed transport device 14 and the beginning of the holding force area 28 is preferably 0 to 15 cm in the case of metal plates 12 customarily used in the sheet metal industry with a thickness of 0.1 mm to 0.4 mm and a maximum format length of 1,000 mm. As already mentioned above the activation of the holding system 22 begins with the formation of a holding force first "delayed" to a point in time when the front edge of the metal plate 12 passes, or has left, the feed transport device 14 and the boundary line 56 (zero line). The metal plate 12 experiences the complete holding force effect when the front edge of the metal plate 12 has already been moved, preferably 0 cm to 40 cm, beyond the feed transport device 14. The metal plate 12 is moved first of all with maximum feed transport velocity into the stacking area 20 without experiencing a holding force effect by means of the overhead transport device 18. During this time the overhead belt 24 located above the metal plate 12 running in can still be accelerated even if the metal plate 12 and the overhead belt 24 are already in contact since the action of the force between the overhead belt 24 and the metal plate 12 is nearly zero with the force of gravity acting downwards on the metal plate 12. The "delayed" engagement of the holding force only occurs when the belt transport velocity of the feed transport device 14 and the overhead transport device 18 are equal. At the same time, the point in time of the engagement can be set later and later with higher velocities of transport. The metal plate 12 will then be fixed more and more completely on the overhead belt 24 by the holding forces then acting "with delay" before the braking process is introduced by means of the overhead transport device 18. Thus the time for the braking of the overhead belts 24 with the metal plate 12 to a transport velocity of zero and for the subsequent re-acceleration of the empty overhead belts 24 (before pick-up of the next metal plate 12) in the apparatus 10 is utilized for the simultaneous transport of the following metal plate 12 by means of the feed transport device 14. A restriction of the transport velocity, as in the case of traditional apparatuses of customary structure, does not take place in the case of the apparatus according to the invention.

An advantageous use of the apparatus 10 according to the invention becomes clear in the following calculation example. In the case of a metal plate length of 1,000 mm and a spacing between the metal plates 12 to be transported of 400 mm as well as in the case of a clock length of 1,400 mm (400 mm+1,000 mm), a clock time of 400 milliseconds results in the case of a rate of transport of 2.5 metal plates per second.

In addition, the following relationships apply for an increase of the transport velocity. With increasing the transport velocity less and less time remains for the process of braking, storing of the metal plate, and re-acceleration of the overhead belt 24 to the maximum transport velocity (feed rate). At high transport velocities the following metal plate 12 thus reaches the overhead belts 24 beginning in the area of the limiting line 56 (zero line) before they have reached the transport velocity of the feed transport device 14 once again. In order to prevent a premature delay of the metal plate 12 running in by the overhead belts 24 still in the acceleration phase, the point in time at which the holding forces are engaged can be set downwards with increasing transport velocity (production velocity). This "delayed" activation of the holding force is made possible due to the following behavior of the metal plate 12 running in at that point in time. In the case of non-activated holding forces the front edge of the metal plate 12 currently running in at that point in time comes to lie first of all on the slightly inclined overhead belts 24. Only after the metal plate 12 has already run several cm. into the stacking device 16 (stack box), would it begin to loosen from the overhead belts 24 and tilt off downwards. With increasing transport velocity the distance which the metal plate 12 runs in into the stacking device before it tilts off downwards becomes larger and larger. This behavior can be utilized by, as described above, the zone of the holding force in the direction of transport 30 being offset behind and/or the point in time of the engagement of the holding forces being set to "later" so that the metal plate 12 has already run in several centimeters into the stacking device with its front edge 16. In so doing the acceleration and braking movement processes of the overhead belts 24 can be initiated by a servomotor in order to achieve high dynamic response. The movement curves can be sensed and controlled by incremental encoders.

In the case of use of a plurality of outer overhead belts 24, the outer overhead belts are preferably adjustable to a format width appropriate for the current metal plate 12 by means of a mechanical coupling, together with lateral guides of the stacking device 16 (stack box), if the apparatus 10 is supposed to be modifiable to metal plates 12 of very different sizes. The fixed spacing dimensions between lateral guides and outer overhead belts 24 is preferably 100 mm. In that case it has been shown that, in particular, relatively wide metal plates 12 can be carried by four overhead belts 24 distributed in the direction of the width. However, at the same time all other formats (format width variants between 700 mm and 1,220 mm) can certainly also be used, in particular even on the outer edges of the corresponding metal plate 12. With an embodiment of this type a reliable transfer of the current metal plate 12 from the feed belt of the feed transport device 14 to the overhead belts 24 of the overhead transport device 18 is possible. Advantageously almost no offset of the brakes is necessary in the case of a format change of metal plate 12 so that there is a relatively greater ease of operation of the apparatus 10. A plus/minus correction merely to be performed in the range of several mm permits a fine adaptation of the metal plate position at the end of the braking process.

It is thus possible by means of the apparatus 10 according to the invention to increase the production capacity with respect to customary transport velocities and at the same time to make possible a relatively simple operation of the apparatus 10.

What is claimed is:

1. An apparatus for transporting and stacking of goods in the form of plates comprising:
    a feed transport device;
    a stacking device, connected to the feed transport device, the stacking device having an overhead transport device which is disposed at least partially in a stacking area above the stacking device and which has a holding system which can be activated and deactivated, and at least one guide wall for an edge of the goods provided with at least one air outlet opening.

2. The apparatus according to claim 1 Wherein the transport velocity of the overhead transport device is adjustable from an initial feed transport velocity to a subsequent stacking velocity.

3. The apparatus according to claim 1, wherein the holding system has at least one overhead belt which is coupled to a holding mechanism selected from the group consisting of a vacuum and a magnetic system to form an adjustable holding force.

4. The apparatus according to claim 1, further comprising a sensor for determining at least one of the group consisting of the size of the goods transported, the speed of the goods transported, the location of the goods transported, the passage of the goods past a predetermined location.

5. The apparatus according to claim 4, wherein the velocity of the overhead transport device changes from an initial feed transport velocity to a subsequent stacking velocity in response to a signal from the sensor.

6. The apparatus according to claim 1, wherein the overhead transport device is configured to release the goods being transported after the overhead transport device has reached a stacking velocity.

7. The apparatus according to claim 6, wherein the overhead transport device is configured to accelerate to the initial transport velocity after releasing the goods being stacked.

8. The apparatus according to claim 6, wherein the apparatus further comprises a sensor, and wherein the overhead transport device releases the goods being stacked in response to a signal from the sensor.

9. The apparatus according to claim 1, wherein the feed transport device and the overhead transport device are disposed overlappingly to form a transport gap.

10. The apparatus according to claim 1 wherein the overhead transport device has a transport surface which is inclined relative to the feed transport device.

11. The apparatus according to claim 10, wherein the transport surface of the overhead transport device has an angle of inclination of about 2° to 5°.

12. The apparatus according to claim 1, wherein the feed transport device and the overhead transport device each have a transport surface, said transport surfaces being spaced relative to one another essentially perpendicular to the direction of transport.

13. The apparatus according to claim 12, wherein the transport surface of the feed transport device is spaced between about 1 mm and 10 mm from the transport surface of the overhead transport device.

14. The apparatus according to claim 1, wherein the overhead transport device comprises a conveyor belt.

15. The apparatus according to claim 2, further comprising a central control or regulatory device configured for adjusting at least one of the operational parameters of the overhead transport device selected from the group consisting of the initial transport velocity, the stacking velocity, the rate of deceleration from the initial transport velocity to the stacking velocity, the rate of acceleration from the stacking velocity to the initial transport velocity subsequent to releasing the goods being stacked, the time delays between changes in overhead transport velocity, the holding of the goods by the holding system, and the release of the goods by the release system.

16. The apparatus according to claim 1, further comprising a central control or regulatory device wherein the central control or regulatory device is configured to allow entry of data selected from the group consisting of the initial transport velocity, the stacking velocity, the dimensions of the goods being stacked, the weight of the goods being stacked, and the number of goods being stacked in a given time period.

17. The apparatus according to claim 15, further comprising a sensor, the sensor being disposed in communication with the central control or regulatory device, the sensor configured for providing information regarding the dimension and/or position of the goods.

18. The apparatus according to claim 1, wherein the stacking device has at least one guide wall for an edge of the goods provided with a plurality of air outlet openings.

19. An apparatus for transporting and stacking of goods in the form of plates comprising:
a feed transport device having a transport surface; and
a stacking device, connected to the feed transport device, the stacking device having an overhead transport device which is disposed at least partially in a stacking area above the stacking device and which has a holding system which can be activated and deactivated, the stacking device having a transport surface which is inclined relative to the transport surface of the feed transport device.

20. The apparatus according to claim 19 wherein the velocity of the holding system is adjustable.

21. The apparatus according to claim 19, wherein the holding system has at least one overhead belt which is coupled to a holding mechanism selected from the group consisting of a vacuum and a magnetic system to form an adjustable holding force.

22. The apparatus according to claim 21, wherein the magnetic system has at least one electromagnet.

23. The apparatus according to claim 22, wherein the electromagnet works according to the principle of flux expulsion which on its activation is suitable for the compensation of a magnetic field of at least one permanent magnet.

24. The apparatus according to claim 19, wherein the feed transport device is disposed above the goods to be transported and is formed as a belt transport device.

25. The apparatus according to claim 19, wherein the transport surfaces are disposed at an angle relative to one another of between about 2° to 5°.

26. A process for transporting and stacking goods where the current goods are fed by means of a feed transport device with an adjustable feed rate to a stacking device, the method comprising:
receiving the goods into an overhead transport device from the feed transport device at an initial transport velocity;
transporting the goods with the overhead transport device at the initial transport velocity into a stacking area;
bringing the goods essentially to a standstill; and
releasing the goods from the overhead transport device for the stacking of the goods in the stacking device so that the goods free fall into a stacking area.

27. The process according to claim 26, wherein the process comprises:
conveying the goods from the feed transport device to the overhead transport device disposed at least partially in the stacking area above the stacking device;
accelerating a holding system of the overhead transport device essentially to the feed velocity of the goods;
activating the holding system for fixing of the goods in a holding force area of the overhead transport device;
braking the holding system with the goods essentially until they come to a standstill in the stacking area; and
deactivating the holding system for stacking of the goods during the free fall setting in essentially in the vertical direction in the stacking device.

28. The process according to claim 27, wherein activating of the holding system occurs after reaching a transport surface of the overhead transport device in the holding area by means of the front area of the goods contacting the transport surface.

29. The process according to claim 26, wherein the method comprises changing the direction of transport by about 2° to 5° from the feed transport device to the overhead transport device.

30. The process according to claim 26, wherein the method comprises sensing a back edge of the goods in a definite transport position by means of a sensor unit.

31. The process according to claim 30, wherein the method further comprises subsequent successive triggering of the activation, the braking, the deactivation, and the acceleration of the holding system in response to signals from the sensor unit.

32. The process according to claim 26, wherein the method comprises activating the holding system as a function of the sensing of a definite transport position of the goods after a constant, in particular, determinable time period has elapsed.

33. The process according to claim 26, wherein the method comprises activating the holding system as a function of transport velocity of at least one of the group consisting of the feed transport device, the material, and the geometric formation of the goods.

34. The process according to claim 26, wherein the method comprises utilizing a parameter-dependent code field in conjunction with a central control device to control automatic transporting and stacking of the goods.

35. The apparatus according to claim 19, wherein the stacking area further comprises at least one guide wall for an edge of the goods provided with air outlet openings.

36. The apparatus according to claim 19, wherein the stacking device is configured to receive the goods at the feed velocity of the feed transport device, slow the goods from the feed velocity to a stacking velocity which is slower than the feed velocity, and release the goods into the stacking area.

37. The apparatus according to claim 36, wherein the stacking velocity is substantially zero.

38. The apparatus according to claim 19, further comprising a sensor configured to determine at least one of the group consisting of the size of the goods and the position of an edge of the goods.

39. The apparatus according to claim 38, wherein the stacking device performs at least one of the group consisting of accelerating to the feed velocity, holding the goods, slowing to the stacking velocity, and releasing the goods, in response to a signal from the sensor.

* * * * *